March 23, 1943.  P. E. DAY  2,314,610
SYNCHRONIZING SYSTEM
Filed Oct. 8, 1940  3 Sheets-Sheet 1
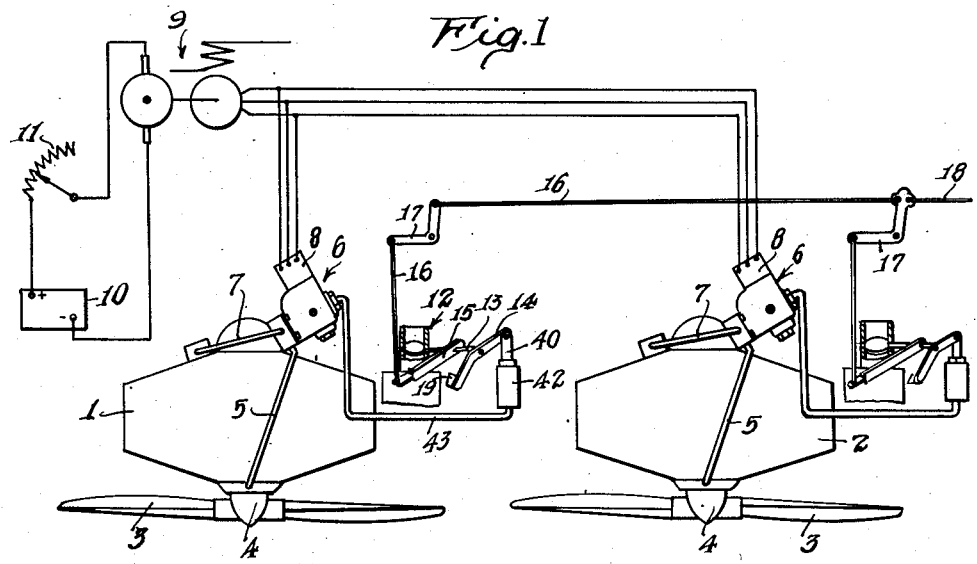
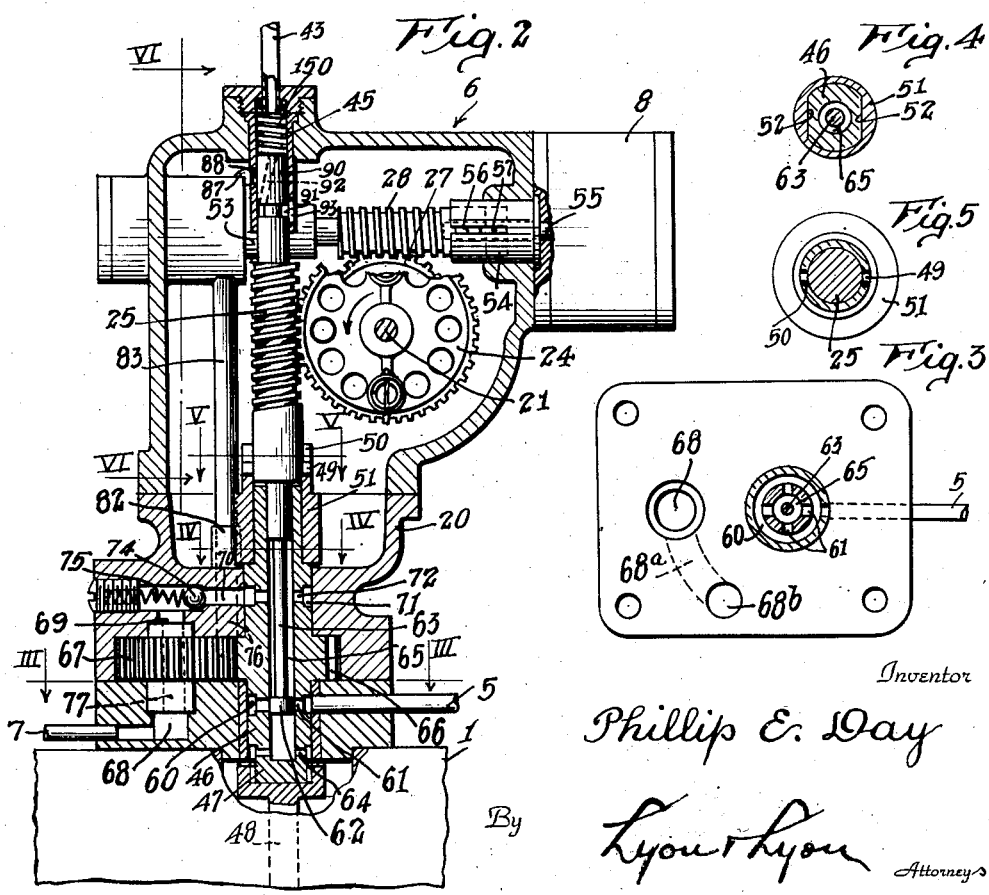
Inventor
Phillip E. Day
By Lyon & Lyon
Attorneys March 23, 1943. P. E. DAY 2,314,610
SYNCHRONIZING SYSTEM
Filed Oct. 8, 1940    3 Sheets-Sheet 2
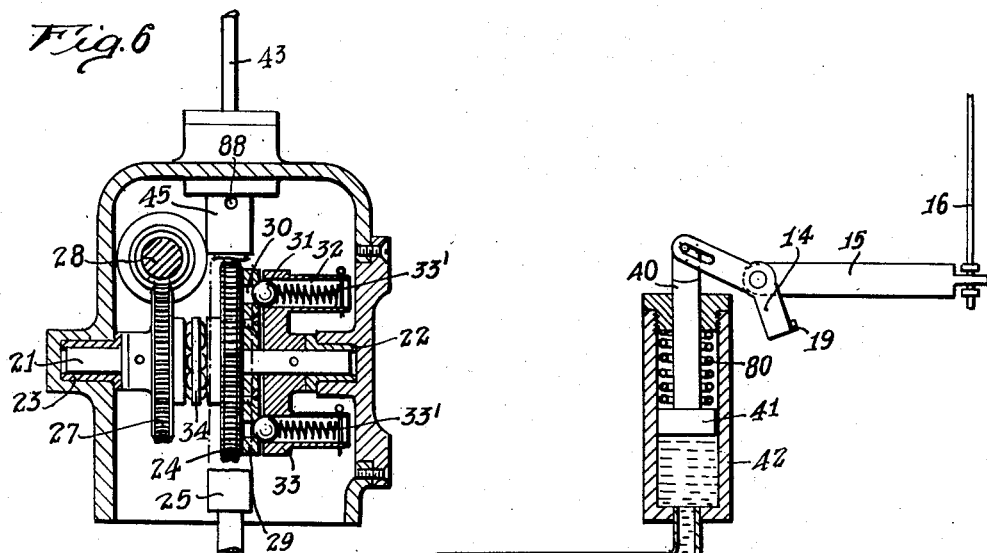
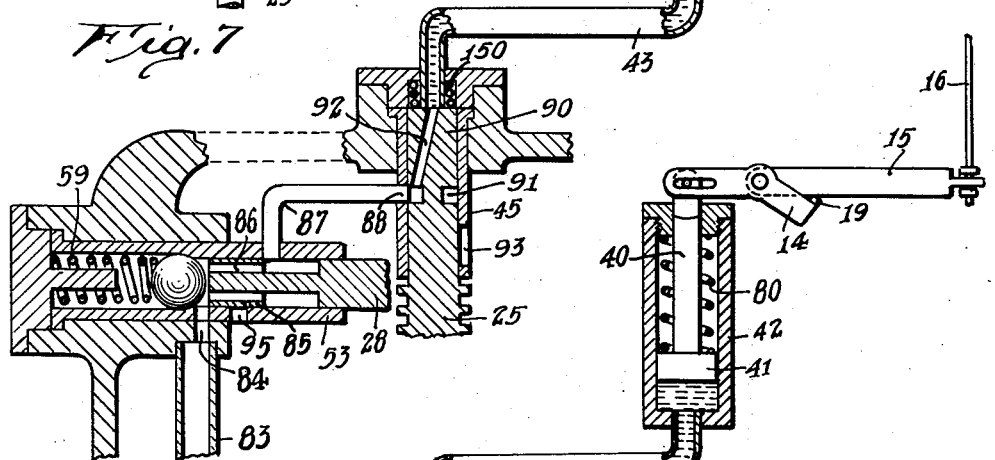
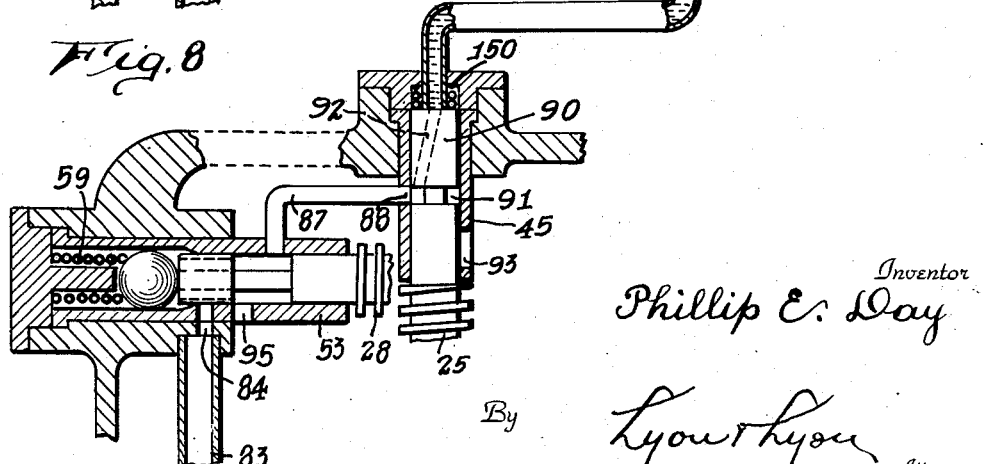
Inventor
Phillip E. Day
By Lyon & Lyon
Attorneys March 23, 1943. P. E. DAY 2,314,610
SYNCHRONIZING SYSTEM
Filed Oct. 8, 1940   3 Sheets-Sheet 3
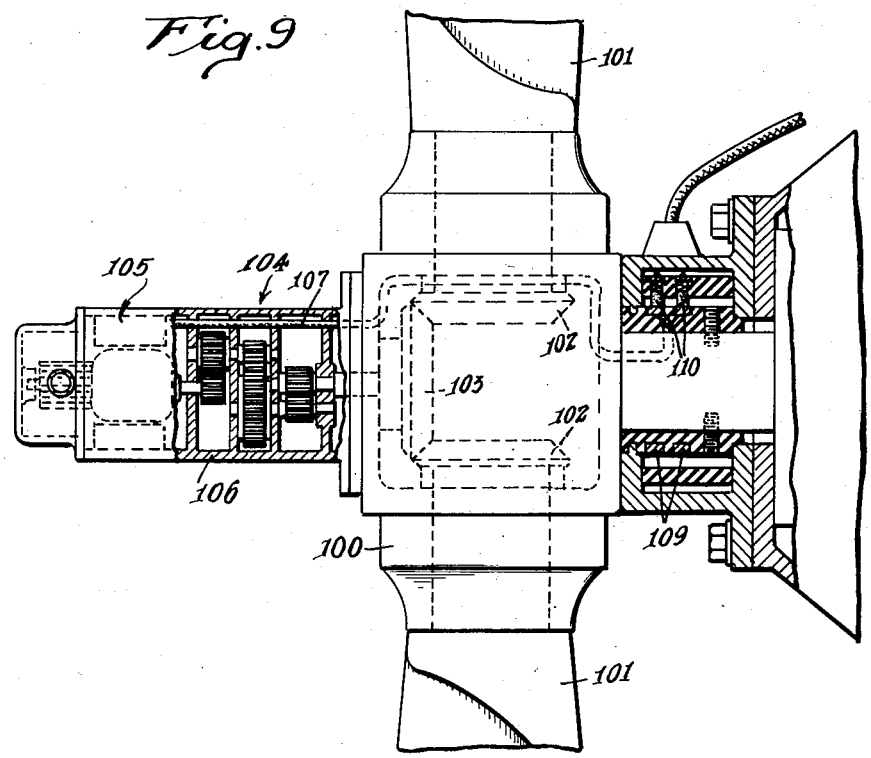
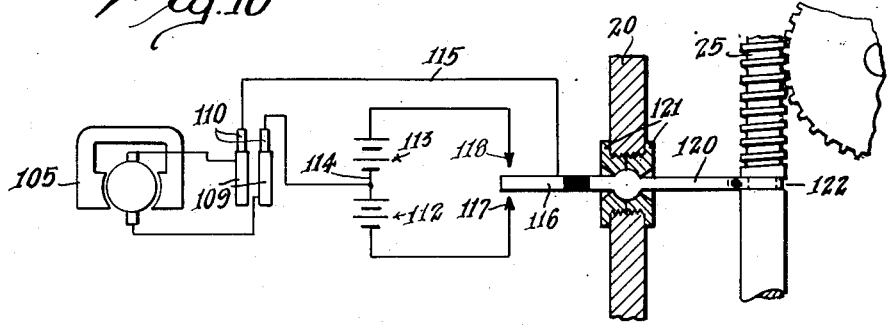
Inventor
Phillip E. Day
By Lyon+Lyon
Attorneys Patented Mar. 23, 1943

2,314,610

UNITED STATES PATENT OFFICE 2,314,610

SYNCHRONIZING SYSTEM

Phillip E. Day, Alhambra, Calif.

Application October 8, 1940, Serial No. 360,296

12 Claims. (Cl. 170—135.6)

This invention relates to systems for synchronizing a plurality of rotary elements, and particularly to the synchronizing of a plurality of aircraft engines having variable pitch propellers.

A general object of the invention is to provide a synchronizing system for aircraft engines that is relatively simple and inexpensive to manufacture, is light in weight, and is particularly reliable and foolproof in operation.

A more specific object is to provide a synchronizing system for a multi-engine airplane having constant speed propellers in which synchronizing is normally maintained by varying the pitch of the propellers while leaving the throttle control with the pilot, but which will also act automatically on the throttle to prevent racing of the engines when changing the pitch of the propellers does not hold down the speed of the engines, as during diving of military planes.

Still another more specific object of the invention is to provide an automatic synchronizing system which, in case of derangement of the synchronizing mechanism, automatically places the propellers in high pitch position and returns the engine control to the pilot.

There are at present two known practical ways of controlling the speed of airplane motors. One is to vary the throttle setting of the engine, and the other is to vary the propeller pitch. The latter method is the more efficient and is the one usually employed, but in making rapid descents, or dives, increasing the propeller pitch to maximum may not function to hold the engine speed within desired limits for the reason that the propeller may still be unable to do sufficient work to absorb the power of the motor. Under such conditions, the throttle must be partially closed to keep the motor speed within the prescribed limits. It will therefore be apparent that it is desirable that in planes subject to rapid maneuvers, such as military craft, the governor for controlling the engine speed should normally control the speed by varying the propeller pitch, but should be able to control the throttle in case the maximum propeller pitch absorbs insufficient power to keep the engine speed within bounds. A specific object of the invention is to accomplish this result in a simple and positive manner.

Other more specific objects and features of the invention will become apparent from the following detailed description to follow of a preferred embodiment of the invention.

In the drawings:

Fig. 1 is a schematic view, showing a general layout of my system as applied to two engines having variable pitch propellers;

Fig. 2 is a vertical, sectional view through one of the synchronizing units of the system shown in Fig. 1;

Figs. 3, 4 and 5 are horizontal sections, taken in the planes III—III, IV—IV, and V—V, respectively, of Fig. 2;

Fig. 6 is a detail, vertical section, taken substantially in the plane VI—VI of Fig. 2;

Fig. 7 is a sectional view showing the throttle control elements in one condition of operation;

Fig. 8 is a view similar to Fig. 7, but showing the parts under a different condition of operation;

Fig. 9 is a view partly in section showing an electrically controlled variable pitch propeller mechanism that can be employed with my invention; and Fig. 10 is a view illustrating the operation of the system with an electrically controlled variable pitch propeller.

Referring to Fig. 1, the system therein disclosed comprises a pair of airplane engines 1 and 2, respectively, each having a variable pitch propeller 3 connected thereto by a hub 4 incorporating a hydraulically controlled pitch varying mechanism. Hydraulic mechanisms for varying the pitch of a propeller are well known in the art, and need not be described in detail herein. Suffice it to say that the propeller normally assumes a full pitch position in which its air resistance to rotation is at maximum but reduces its pitch in response to supply of pressure liquid thereto through a pipe 5.

In the present system, oil is supplied through the pipe 5 from the oiling system of the engine under the control of a synchronizing unit 6 associated with each engine and having an oil supply pipe 7 extending from the oiling system of the engine. Each synchronizing unit 6 includes a synchronous A. C. electric motor 8 driven at the same speed as the corresponding motor 8 on the other engine from a common motor generator set 9 energized from a storage battery 10 and adapted to be driven at different selected speeds by means of a rheostat 11. Each engine 1 also includes a throttle valve 12 illustrated as being of the butterfly type and having an actuating shaft 13 to which is keyed an actuating lever 14. An arm 15 is rotatably mounted on each shaft 13 and connected by rods 16 and bellcrank levers 17 to a control rod 18 which is manually actuated by the pilot. Under certain conditions to be described later, the arm 15 is engaged by an ear 19 on the lever 14 so that the lever 14 follows the movements of the arm 15 and the throttle is under the manual control of the pilot. Under other conditions, as will appear later, the lever 14 takes control of the throttle away from the arm 15.

Each lever 14 is pivotally connected by a pin and slot connection to the piston rod 40 of a piston 41 (Fig. 7) mounted in a cylinder 42 adapted to be supplied with oil under pressure through a pipe 43 from its associated synchronizing unit 6.

Referring now to Fig. 2, each synchronizing unit 6 includes a casing 20 which may be formed in several parts, as shown for convenience of assembly, and is rigidly mounted on its associated engine 1 or 2, as the case may be. A horizontal shaft 21 is mounted within the casing 20 and is rotatably supported at its opposite ends (Fig. 6) in bearing bushings 22 and 23, respectively. Pinned to shaft 21 is a wormwheel 27 which meshes with a horizontal worm 28. Rotatably journaled on the shaft 21 is a wormwheel 24 (Figs. 2 and 6) which meshes with a vertical worm 25.

Referring now to Fig. 6, the wormwheel 24 has rigidly secured against its right face a disc 29 having an annular row of holes 30 adapted to partially receive detent balls 31 supported in passages 32 in a disc 33 pinned to the shaft 21. The detent balls 31 are yieldably urged against the disc 29 by compression springs 33', and the assembly, including the discs 29 and 33 and the detent balls 31, constitutes a clutch for yieldably coupling the wormwheel 24 to the shaft 21 for rotation therewith and with the wormwheel 27. The thrust on the wormwheel 24 through the detent balls 31 is received by a ball-thrust bearing 34 interposed between the wormwheels 24 and 27.

So long as the torque developed between the wormwheels 24 and 27 does not exceed a predetermined value, the two wormwheels rotate together, but when the torque does exceed a predetermined value, the balls 31 are forced out of the holes 30, permitting the two wormwheels to rotate at different speeds. The particular clutch mechanism disclosed has the great advantage that it always releases in response to the same differential torque and offers very little friction when it is slipping. The low friction is particularly advantageous because it prevents the generation of an objectionable amount of heat when the clutch is slipping.

It should be remembered that during normal operation of the device, the clutch is engaged and the two wormwheels 24 and 27 rotate together at the same speed.

Referring now to Fig. 2, the vertical worm 25 is rotatably, vertically, slidably supported at its upper end in a bearing bushing 45, and at its lower end it is supported for vertical sliding movement in a sleeve 46, which sleeve in turn is rotatably supported in the casing 20 and extends through the bottom of the casing where it has a splined end 47 engaged in driven relation with a shaft 48 of the engine, so that the sleeve 46 is always rotated in synchronism with its associated engine 1 or 2, as the case may be.

The worm 25 is constrained to rotate with the sleeve 46 while being movable vertically with respect thereto. Thus the worm 25 has a pair of diametrically opposite pins 49 slidable vertically in slots 50 in a coupling member 51, which, as best shown in Fig. 4, has flat surfaces 52 engaging corresponding flat surfaces on the sleeve 46.

It will be apparent from the foregoing description that the worm 25 is forced to rotate in synchronism with its associated engine, but can move vertically.

The horizontal worm 28 is rotatably and longitudinally slidably supported at its left end (Fig. 7) in a bushing 53 and at its right end (Fig. 2) is slidably and rotatably supported in a stationary bearing member 54. The right end of the worm is counterbored to receive the end of the shaft 55 of the associated synchronous motor 8, and the motor shaft 55 has a key 56 thereon engaging a slot 57 in the hole in the right end of the worm 28 so that the worm is constrained to rotate with the motor shaft 55.

With the structure so far described, so long as the worms 25 and 28 connected to the engine and the electric motor, respectively, rotate at predetermined desired relative speeds, there is no longitudinal movement of the worms. However, in response to any departure from the predetermined relationship, one or both of the worms 25 and 28 will be shifted longitudinally. The worm 28 is urged to the right (Fig. 7) by a compression spring 59 of appreciable stiffness so that the worm 28 has a greater tendency to remain stationary (longitudinally) than does the worm 25 which is urged downwardly only by the force of gravity. Therefore, in response to slight differences in relative rotational speeds of the worms 25 and 28 the worm 25 will move upwardly or downwardly and will control the pitch-varying mechanism of the associated propeller and/or the throttle of that engine to bring the engine speed back to normal (normal speed being determined by the synchronous electric motor 8). However, should the apparatus be damaged (in a military plane the motor 8 might be shot away) so that the worm 25 continues to rotate faster than the worm 28, then the worm 28 may be urged to the left against the force of the spring 59 and will function to restore the control of the engine throttle to the pilot.

Considering now the mechanism for varying the pitch of the propeller in response to a departure of the engine from proper speed, it will be recalled that the pitch of the propeller is normally at maximum but is reduced in response to supply of oil under pressure through the tube 5 (Fig. 1).

Referring now to Fig. 2, the tube 5 communicates with an annular groove 60 in the sleeve 46, which groove communicates with ports 61, which ports are normally closed, when the engine is running in synchronism with the motor 8, by a piston 62 mounted on a lower extension 63 of reduced diameter, of the worm 25. In the position shown in Fig. 2, the piston 62 closes the ports 61, preventing escape of oil from the tube 5 so that the pitch-varying mechanism remains in whatever position it may have been set. However, if the piston 62 rises, then oil can escape from the tube 5 through the ports 61 into the space below the piston, and thence through ports 64 back into the engine crankcase, permitting the propeller to increase its pitch. A rise of the piston 62 would result from excessive speed of the engine and the increase in the pitch would bring the speed back down to normal. On the other hand, if the engine runs too slow, the worm 25 and the piston 62 will drop, permitting oil to be delivered to the pipe 5 from the space 65 surrounding the extension 63, which space is maintained at all times with oil under pressure by a pump to be described. Obviously, the supply of oil under pressure from the space 65 through the tube 5 to the pitch-varying mechanism of the propeller will reduce the pitch of the propeller, thereby permitting the engine to accelerate and come back to normal speed.

The mechanism for supplying oil under pressure to the space 65 comprises a gear pump including a gear 66 formed integral with the sleeve 46, and an idler gear 67. Oil is supplied from the engine oiling system through the pipe 7, previously mentioned, to a recess 68 (Figs. 2 and 3), below the idler gear 67, and thence through a passage 68a and a port 68b into the chamber containing the pump gears 66 and 67, on the input side of the gears. This oil is delivered from the output side of the pump gears 66 and 67 through a passage 69 and a passage 70 into an annular groove 71 in the sleeve 46 and through ports 72 in the sleeve into the space 65.

To limit the pressure of the oil supplied to the space 65, a ball, relief valve 74 controlled by a spring 75 is provided. When the pressure rises above the desired value, oil is forced past the ball 74 into a recess 76 above the idler gear 67 and thence through an axial passage 77 in the idler gear, back to the inlet recess 68.

During ordinary operation, variations in the pitch of the propellers occasioned by operation of the piston 62 is sufficient to maintain the engines 1 and 2 at a fixed speed relative to the synchronous generator 9 and under these conditions it is desirable that the pilot have the throttle valves of the engines under his manual control so that he can increase or decrease the power developed by the engines. Under these conditions, the levers 14 (Fig. 1) are urged counterclockwise (with reference to Fig. 8), until their lugs 19 engage against their associated arms 15 by compression springs 80 within the cylinders 42, which compression springs urge the pistons 41 into lowermost position. With the lugs 19 on the levers 14 maintained against the arms 15, which are manually controlled by the pilot, the throttle valves are under the manual control of the pilot.

However, under certain conditions, it is desirable to automatically close, or partially close, the throttle, as, for instance, when the plane goes into a dive, and movement of the propeller into position of maximum pitch (by actuation of the valve piston 62, in Fig. 2), does not apply sufficient load to the engines to prevent them from racing. The mechanism for reducing the throttle opening automatically in response to excessive upward movement of the worm 25, will now be described:

Referring to Fig. 2, a nipple 82 communicates with the passage 70 containing oil under pressure, and the nipple connects to a pipe 83 extending upwardly through the casing 20 to the structure supporting the left end of the worm 28. Referring now to Fig. 7, the upper end of the pipe 83 communicates with a port 84 in the bushing 53, which port is normally uncovered by a piston 85 on the left end of the worm 28. Furthermore, this piston 85 has longitudinal passages 86 therethrough permitting the pressure fluid to flow from the pipe 83 to the right end of the piston 85 and thence through a pipe 87 to a port 88 in the bushing 45 which slidably supports the upper end of the worm 25.

Referring now to Fig. 2, the port 88 is normally closed by a piston 90 on the upper end of the worm 25, so that flow of pressure fluid through the port 88 is blocked. Furthermore, the piston 90 has a longitudinal passage 92 which communicates the pipe 43 with a groove 91 and the groove 91 is under normal operating conditions juxtaposed to an elongated vent port 93 in the bushing 45 so that oil in the lower end of the cylinder 42 (Fig. 7) can escape through the pipe 43 to passage 92, the groove 91 and the port 93 to the case 20 (from which it can drain back into the engine through a vent, not shown). Hence under normal conditions the piston 41 (Fig. 7) is free to be moved downwardly by the compression spring 80 until the abutment 19 on the lever 14 engages the manually controlled arm 15, as shown in Fig. 8, thereby placing the throttle under manual control.

However, if the worm 25 (Fig. 2) rides upwardly beyond its normal range of vertical movement (as a result of failure of increase in pitch of the propeller to hold down the engine speed, as during a dive) the piston 90 thereon quickly moves into the extreme uppermost position shown in Fig. 7, in which the groove 91 is carried out of registration with the vent port 93 and into registration with the port 88, thereby applying pressure fluid through the pipe 43 and into the cylinder 42 to elevate the piston 41 and rotate the throttle lever 14 clockwise to close the throttle, the movement carrying the abutment 19 away from the manually controlled arm 15. Of course the closure of the throttle in the manner described reduces the speed of the engine until it is below normal, whereupon the worm 25 will move downwardly, back into the position shown in Fig. 2, in which oil will be vented from the cylinder 42 and the spring 80 will again open the throttle. So long as the plane remains in the dive and the speed cannot be kept down to normal by adjustment of the pitch of the propeller (which remains in high pitch position) the worm 25 will reciprocate up and down to close and open the throttle as necessary to maintain the engine within a reasonable speed range. When the plane pulls out of the dive, the throttle will again be restored to manual operation and the proper speed will be maintained solely by automatic adjustment of the pitch of the propeller.

It has been mentioned that one abnormal condition requiring automatic closing of the throttle is the diving of the airplane. During military operations this would probably be the most common cause of excessive engine speed. However, there are other conditions that might create such a condition. Thus if a propeller were damaged or destroyed, the engine might race if it were not for the automatic provision for closing the throttle of that engine.

The mechanism so far described will prevent excessive engine speeds which increase the speed of rotation of the worm 25 above its proper speed, relative to the normal speed of the worm 28 driven by the synchronous electric motor 8. However, a stoppage of the motor 8 would create the same relative difference in speed between worms 25 and 28 and would result in the closing of the engine throttle. This would be dangerous, particularly in a military plane, because the closure of the throttle might result in the killing of the engine. To prevent killing of the engine, I provide an auxiliary mechanism which will function when a difference in the proper relative speeds of the worms 25 and 28 continues, even after the worm 25 has been carried to the upper limit of its travel.

Thus it will be apparent from Fig. 2 that after the worm 25 has been carried to the upper limits of its movements, continued rotation of the worm will force the wormwheels 24 and 27 to rotate counterclockwise at an increased rate relative to the rate of rotation of the worm 28, thereby shifting the worm 28 longitudinally to the left (Fig. 8) against the force of the compression spring 59. This carries the piston 85 into position, blocking the port 84 and disconnecting the pipe 87 from the pressure oil in pipe 83 and connecting it to a vent port 95, so that oil is exhausted from the cylinder 42, permitting the spring 80 to move the piston 41 downwardly and rock the throttle lever 14 counterclockwise until the abutment 19 is carried against the throttle arm 15, restoring the control of the throttle to the pilot.

*Summarizing.*—During normal operation, the worm 25 moves slowly up and down through a very limited range of movement, sufficient only to carry the valve piston 62 clear of the ports 61 to thereby control the speed of the engine by varying the pitch of the propeller. If increasing the pitch of the propeller is insufficient to hold down the speed of the engine, the worm 25 rides into its uppermost position, as shown in Fig. 7, in which it exercises control over the throttle cylinder 42 and closes the throttle. If the difference in speed between the engine and the synchronous electric motor is due only to excessive engine speed, the closure of the throttle will restore the proper speed relation between the worms 25 and 28, respectively, and the worm 28 will not be moved longitudinally. On the other hand, if the worm 28 has been slowed down, or stopped, as the result of a failure of the synchronous motor or its energizing system, then the closure of the engine throttle will still not restore the proper speed relation between the two worms and the worm 28 will be moved to the left to place the engine throttle under the control of the pilot. Should the difference in speed between the worms 25 and 28 still continue, then the clutch balls 31 (Fig. 6) will be forced out of the holes 30, permitting the wormwheel 27 to stop while the wormwheel 24 continues to rotate, thereby preventing damage to the synchronizing mechanism.

If the pilot is able to repair the synchronizing motor 8, or its energizing source, the clutch balls 31 will again engage the holes 30 as soon as the motor 8 is again brought up to speed, and automatic control will be restored.

It will be observed from the foregoing description and the drawings, that the weight of the worm 25 tends to carry it downwardly at all times, thereby tending to rotate the wormwheel 24 and the wormwheel 27 in such a direction as to aid the rotation of the worm 28 in its normal direction. As a result, the engine driven worm 25 overcomes substantially all the friction in the mechanism and the synchronizing motor 8 does not have to supply any appreciable power. This is important because it permits the synchronizing motor 8 to be very small and light, and permits a corresponding reduction in the size and weight of the motor generator set 9.

The system has been described with reference to hydraulically actuated, variable pitch propellers. However, the system is not limited to the use of hydraulically actuated propellers, but the system may be employed as shown in Figs. 9 and 10 for use with an electrically controlled variable pitch propeller.

Referring to Fig. 9, the propeller therein illustrated comprises a hub 100 having a pair of propeller blades 101 rotatably mounted therein, each blade having on its inner end a bevel gear 102, both of which mesh with a common bevel gear 103. Rotation of the bevel gear 102 simultaneously rotates the gears 102 and the blades 101—101 in opposite directions to vary the pitch of the blades, and the gear 103 is selectively rotatable in either direction through a gear train 104 by a reversible electric motor 105, all contained in a case 106 extending axially from the hub of the propeller. The gear train 104 may be of conventional construction and is merely for the purpose of providing a large speed reduction between the motor 105 and the gear 103 so that a small motor will have sufficient power to rotate the propeller blades and at the same time provide sufficient friction so that the mechanism is irreversible; i. e., the motor cannot be rotated by the propeller blades. The motor 105 may be any one of a number of types. A common type that might be employed is an ordinary D. C. motor having a permanent magnet field and a conventional armature, commutator and brushes. Such a motor may be run in either direction by merely reversing the current to the brushes. In the particular motor shown in Fig. 9 the leads from the motor are carried by a cable 107 back through the gear train 104 and through the hub 100 and connected to a pair of slip rings 109 on the propeller shaft, which slip rings are engaged by a pair of brushes 110. One of the brushes 110 is connected to a common contact 114 between a pair of batteries 112 and 113, and the other brush 110 is connected by a lead 115 to a contact 116 which is adapted to be connected to either one of two contacts 117 and 118, respectively. Contact 117 is connected to the negative terminal of the battery 112 and the contact 118 is connected to the positive terminal of battery 113. Therefore if the movable contact 116 is moved upwardly into engagement with the contact 118, current is supplied to the armature of the motor 105 in one direction from the battery 113 and if the contact 116 is moved downwardly against the fixed contact 117, current is applied to the armature of the motor 105 in the opposite direction from the battery 112. When the contact 116 is in mid-position, it contacts with neither of the contacts 117 nor 118 and the motor 105 remains stationary.

In the modification shown in Fig. 10, the contact 116 is adapted to be actuated by vertical movement of the worm 25. To this end contact 116 is insulatingly secured to the outer end of a lever 120 which is fulcrumed as by a pair of bushings 121 in the wall of the casing 20 and has on its inner end a yoke engaging an annular groove 122 in the worm 25. Therefore vertical movement of the worm 25, in response to excessive speed of the associated engine, will close the movable contact 116 on the contact 117 to drive the electric motor 105 in such a direction as to increase the pitch of the propeller blades 101. On the other hand, if the engine runs too slow and the worm 25 moves downwardly, the contact 116 will be closed on contact 118 to run the electric motor 105 in the opposite direction and reduce the pitch of the propeller blades 101.

It will be observed that the electrical control system as described functions merely to vary the pitch of the propeller and takes the place of the hydraulically actuated variable pitch propeller and the hydraulic system, including the valve piston 62 of Fig. 2. However, there need be no other change in the system shown in Fig. 2, and the other hydraulic elements incorporated in the system of Figs. 2, 7 and 8 can be employed to control the throttle.

A particular advantage of my system, whether it employs the full hydraulic control or the electrical control of the variable pitch propeller and hydraulic control of the throttle, is that it is very simple to install, as no elaborate adjustments are required. Thus having determined the normal speed at which the engines are to run, the motor generator set 9 is set to run at a corresponding speed, whereupon the system will automatically function to bring the motors to normal speed. The pilot can change the normal speed at will by adjusting the rheostat 11 to vary the speed of the variable generator motor set. Obviously any other known methods of varying the speeds of the motor generator may be employed. Thus a common method of regulating the speed of such rotary devices is to have an adjustable centrifugal governor on the motor shaft which applies a brake to hold the motor to a predetermined speed.

A useful feature of my invention is the fact that it employs two separate wormwheels 24 and 27, respectively, cooperating with the two worms 25 and 28, respectively. The advantage of this arrangement is that it permits making these two wormwheels 24 and 27 of different diameters so that the engines run at a different speed than the synchronous electric motors. In the particular construction shown, the wormwheel 27 is made smaller than the wormwheel 24 so that the normal speed of the synchronizing motor 8 is less than the speed of the engine. This is advantageous because it is easier to design and build synchronous motors for operation at relatively low speeds than for operation at extremely high speeds. At high speeds and frequencies, the hysteresis and eddy current losses in A. C. motors and generators, become excessive.

It has previously been indicated that by virtue of the vertical positioning of the worm 25 its weight is constantly effective on the wormwheel 24 to advance the latter and thereby reduce the load on the synchronizing motor 8. Ordinarily, the frictional resistance to rotation of the wormwheel assembly is very small and the weight of the worm 25 is ample to provide all the torque necessary to rotate the wormwheel assembly. However, the torque applied by the worm 25 to the wormwheel assembly may be further increased, if desired, by inserting a helical compression spring 150 between the upper end of the worm and the housing so as to urge the worm downwardly. Obviously, it may be desirable in some installations to so position the apparatus that the worm 25 will extend horizontally, or even be completely reversed, and under those conditions the spring 150 would be necessary to cause the worm 25 to apply sufficient torque to the wormwheel assembly to take the load off the synchronizing motor 8. It will be understood that the strength of the spring 150 can be increased, if desired to a point where the worm 25 will not only carry the entire frictional load of the worm wheel assembly, but will also apply a substantial force from the wormwheel 27 to the worm 28 to thereby aid the synchronizing motor 8 in overcoming its own frictional resistance to rotation. Of course the force of the spring 150 must never be made sufficient to overcome the spring 59 (Fig. 7) during normal operation of the mechanism.

For the purpose of explaining the invention a specific embodiment thereof, with one variation, has been described in detail, but it will be apparent to those skilled in the art that many changes other than those mentioned can be made without departing from the invention, and the latter is, therefore, to be limited only to the extent set forth in the appended claims.

I claim:

1. In combination, a controlling rotary device, a controlled rotary device, a wormwheel member and means for supporting it for rotation about a fixed axis, a worm member meshing with the wormwheel member and means for supporting it for both rotary and axial movement while it remains in mesh with the wormwheel member, means for rotating one of said members in synchronism with said controlling device and means for rotating the other said member in synchronism with said controlled device, whereby said worm member is moved axially in response to departure from a predetermined speed relation between said two devices, control means movable to vary the speed of said controlled device and means responsive to axial movement of said worm member for actuating said control means in a direction to restore said predetermined speed relation between said devices, said worm member being positioned vertically and being rotated by said controlled device in such direction with respect to the direction of its pitch that the meshing portion of said wormwheel moves downward with respect to the worm member, whereby the weight of the worm member tends to advance said wormwheel, and whereby the greater portion of the power required to rotate the wormwheel and worm is supplied by said controlled rotary device.

2. In combination, an engine of substantial power, the speed of which is to be controlled, a controlling rotary device of small power, a wormwheel member supported for rotation about a fixed axis and means coupling said wormwheel member to said rotary device for rotation in synchronism therewith, a worm member meshing with the wormwheel member and means for supporting it for rotary and axial movement, means for rotating said worm member by said engine in synchronism therewith, whereby said worm member is moved axially in response to departure from a predetermined speed relation between said engine and said controlling device, control means movable to vary the speed of said engine, means responsive to axial movement of said worm member for actuating said control means in a direction to restore said predetermined speed relation between said engine and said controlling means, and means effective in all axial positions of said worm member for yieldably urging said worm axially in direction tending to rotate said wormwheel in its normal direction whereby at least most of the power required to rotate said worm and wormwheel is supplied by said engine, and the load on said controlling device is reduced.

3. In combination, an engine of substantial power, the speed of which is to be controlled, a controlling rotary device, a first rotary member having helical threads and being mounted for both rotation and axial movement, a second member meshing with said threads and capable of rotary movement simultaneously with either rotary or axial movement of said first member, means for rotating said first member by said engine in synchronism therewith, and means for rotating said second member by said controlling device in synchronism therewith, whereby said first member is moved axially in response to departure from a predetermined speed relation between said engine and said controlling device, control means movable to vary the speed of said engine, means responsive to axial movement of said first member for actuating said control means in a direction to restore said predetermined speed relation between said engine and said controlling device, and means effective in all axial positions of said first member yieldably urging it axially in direction tending to rotate said second member in its normal direction, whereby at least most of the power required to rotate said first and second members is supplied by said engine, and the load on said controlling device is reduced.

4. In combination, a controlling rotary device, a controlled rotary device, a wormwheel member including two wormwheels and means supporting said wormwheel member for rotation about a fixed axis, means intercoupling said wormwheels for simultaneous rotation, a first worm member meshing with one of said wormwheels and means for supporting it for rotary and axial movement, a second worm member meshing with the other said wormwheel and means for supporting it for rotary movement, means for rotating one of said worm members in synchronism with said controlling device, and means for rotating the other of said worm members in synchronism with said controlled device, whereby said first worm member is moved axially in response to departure from a predetermined speed relation between said two devices, control means movable to vary the speed of said controlling device, and means responsive to axial movement of said first worm member for actuating said control means in a direction to restore said predetermined speed relation between said devices.

5. The combination as described in claim 4, in which the means interconnecting said wormwheels comprises a clutch yieldable in response to a predetermined torque to permit relative rotation of said wormwheels.

6. Apparatus as described in claim 4, in which the means for intercoupling the said two wormwheels includes a pair of juxtaposed clutch members, one having ball detents spring-pressed therefrom, and the other having recesses for receiving said detents, the balls remaining in the recesses and intercoupling the members for rotation in unison so long as the torque between the clutch elements remains below a predetermined value insufficient to depress the spring-pressed ball detents.

7. In combination, a controlling rotary device, a controlled rotary device, a wormwheel member and means supporting it for rotation about a fixed axis, a pair of worms both meshing with said wormwheel member, and means supporting both worms for rotary and axial movement, means for rotating one of said worms in synchronism with said controlling device, and means for rotating the other worm in synchronism with said controlled device, whereby at least one of said worms is moved axially in response to departure from a predetermined speed relation between said two devices, yieldable means for normally retaining one of said worms in a predetermined axial position, a speed-controlling element movable to vary the speed of said controlled device, a manual control member and means for normally placing said speed controlling element under the control of said manual control member, means responsive to axial movement of said other worm member produced by excessive speed of said controlled device, relative to said controlling device, for taking said speed-controlling element out of the control of said manual control member and moving it in direction to reduce the speed of said controlled device, means limiting axial movement of said other worm member, and means responsive to axial movement of said one worm member for restoring said speed-controlling element to the control of said manual control member.

8. In combination, a controlling rotary device, a controlled rotary device having a control element movable to vary its speed, a manual control device, means for normally placing said speed control element under control of said manual control device, synchronizing means including a first rotatable member, and means for rotating it in synchronism with said controlling device, a second rotary member, and means for rotating it in synchronism with said controlled device, said mechanism including means responsive to initial increase in the speed of said controlled rotary device relative to said controlling rotary device for moving said speed control element independently of said manual control device in a direction to reduce the speed of said controlled rotary device, and means responsive to continued increase in speed of said controlled rotary device relative to said controlling rotary device for restoring said speed control element to the control of said manual control device.

9. In combination, a controlling rotary device, a controlled rotary device having a control element capable of controlling the speed of said controlled rotary device to any value within its speed range, a manual control device, means for normally placing said speed-control element under the control of said manual control device, a synchronizing mechanism including first and second members driven in synchronism with said controlled rotary device and said controlling rotary device, respectively, means responsive to increase in the speed of said first member above a predetermined value relative to said second member for moving said speed-control element in direction to reduce the speed of said controlled rotary device, and means responsive to failure of said control element to restore the predetermined speed relation between said first and second members for restoring said speed-control element to the control of said manual control device.

10. In combination, a controlling rotary device, a controlled rotary device, a wormwheel member and means supporting it for rotation about a fixed axis, a first worm member meshing with said wormwheel member and means for supporting it for rotary movement and substantially unrestricted axial movement, means for rotating said first worm member in synchronism with said controlled device, a second worm member meshing with said wormwheel member and means supporting it for free rotary movement and restricted axial movement, means for rotating said second worm member in synchronism with said controlling device and means limiting the range of movement of said first worm member, whereby, in response to departure from a predetermined speed relation between said controlled device and said controlling device, said first worm member is first moved axially to the limit of its movement, whereupon continued departure from said predetermined speed relation moves said second worm member axially, a control element movable to vary the speed of said controlled device, a manual control device, means for placing said speed-control element under the control of said manual control device, means responsive to movement of said first worm member into its limit position for moving said speed-control element independent of said manual control device in direction to restore said predetermined speed relation, and means responsive to said axial movement of said second worm member for restoring control of said control element to said manual control device.

11. The combination as described in claim 10, in which said means for placing said control element under control of said manual control device includes a spring; said means for controlling said speed-control element independently of said manual control device includes hydraulic motor means, and means for supplying fluid thereto under pressure, including valve means actuated by said first worm member; and said means for restoring control of said speed-control element to said manual control device includes valve means actuated by said second worm member for removing fluid pressure from said hydraulic motor means.

12. In combination, an airplane engine having coupled thereto a variable pitch propeller, a controlling rotary device, synchronizing means including a first member rotatable in synchronism with said engine and a second member rotatable in synchronism with said controlling rotary device, means movable through a range of movements in response to a departure of said first and second members from a predetermined speed relation, said means moving in one direction in response to increase in speed of said engine, and in the opposite direction in response to reduction in speed of said engine relative to said controlling device, means responsive to initial small movement of said movable means in either direction to vary the pitch of said variable pitch propeller, whereby to change the load on the engine in such a way as to tend to restore the engine to normal speed, and means responsive to further movement of said movable member in direction indicative of excessive speed of said engine, to reduce the power output of the engine.

PHILLIP E. DAY.